United States Patent
Hu et al.

(10) Patent No.: US 11,119,812 B2
(45) Date of Patent: Sep. 14, 2021

(54) METHOD AND DEVICE FOR PROCESSING APPLICATION PROGRAM PAGE ACCORDING TO A COMMON INTERFACE CONTAINER

(71) Applicant: Tencent Technology (Shenzhen) Company Limited, Shenzhen (CN)

(72) Inventors: Haojun Hu, Shenzhen (CN); Chao Lin, Shenzhen (CN); Hao Hu, Shenzhen (CN); Qingjie Lin, Shenzhen (CN); Shunhang You, Shenzhen (CN); Zongzhuo Wu, Shenzhen (CN); Shangtao Liang, Shenzhen (CN); Zhaowei Wang, Shenzhen (CN); Yi Duan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 113 days.

(21) Appl. No.: 16/359,795

(22) Filed: Mar. 20, 2019

(65) Prior Publication Data
US 2019/0220304 A1 Jul. 18, 2019

Related U.S. Application Data

(63) Continuation of application No. PCT/CN2017/112060, filed on Nov. 21, 2017.

(30) Foreign Application Priority Data

Nov. 25, 2016 (CN) .......................... 201611062086.6

(51) Int. Cl.
*G06F 9/48* (2006.01)
*G06F 9/445* (2018.01)
(Continued)

(52) U.S. Cl.
CPC ................ *G06F 9/48* (2013.01); *G06F 3/048* (2013.01); *G06F 9/445* (2013.01); *G06F 9/451* (2018.02);
(Continued)

(58) Field of Classification Search
None
See application file for complete search history.

(56) References Cited

U.S. PATENT DOCUMENTS 8,082,294 B2 * 12/2011 Krahulec .............. G06F 16/972
709/203
8,868,637 B2 * 10/2014 Rosenstein ......... H04L 67/2819
709/202
(Continued)

FOREIGN PATENT DOCUMENTS

CN 1722088 A 1/2006
CN 102065133 A 5/2011
(Continued)

OTHER PUBLICATIONS

Tencent Technology, Written Opinion, PCT/CN2017/112060, dated Feb. 22, 2018, 5 pgs.
(Continued)

*Primary Examiner* — Abu Zar Ghaffari
(74) *Attorney, Agent, or Firm* — Morgan, Lewis & Bockius LLP

(57) ABSTRACT

This application relates to an application interface processing method performed at a terminal. After running a parent application on an operating system, the terminal generates, by the parent application, a common interface container by using a common resource of a plurality of child application interfaces. In response to an event of launching a first child application interface, the terminal loads an independent resource of the first child application interface in the com-
(Continued)

mon interface container, the independent resource including data in the child application interface other than the common resource. Finally, the terminal generates and displays the first child application interface according to the common interface container.

15 Claims, 18 Drawing Sheets

(51) Int. Cl.
*G06F 16/958* (2019.01)
*G06F 9/451* (2018.01)
*G06F 3/048* (2013.01)

(52) U.S. Cl.
CPC ...... *G06F 16/972* (2019.01); *G06F 2209/482* (2013.01); *G06F 2209/545* (2013.01)

(56) References Cited

U.S. PATENT DOCUMENTS

| | | | |
|---|---|---|---|
| 9,268,547 B2 * | 2/2016 | Manion | H04L 67/34 |
| 2002/0038349 A1 * | 3/2002 | Perla | G06F 11/3684 |
| | | | 709/217 |
| 2005/0188329 A1 * | 8/2005 | Cutler | G06F 3/0481 |
| | | | 715/804 |
| 2006/0143622 A1 * | 6/2006 | Prabandham | G06F 9/445 |
| | | | 719/328 |
| 2007/0143704 A1 * | 6/2007 | Laird-McConnell | G06F 9/451 |
| | | | 715/781 |
| 2008/0071929 A1 * | 3/2008 | Motte | H04L 67/02 |
| | | | 709/246 |
| 2008/0091761 A1 * | 4/2008 | Tsao | G06F 3/0482 |
| | | | 709/201 |
| 2008/0201118 A1 * | 8/2008 | Luo | G06F 16/958 |
| | | | 703/2 |
| 2011/0055683 A1 * | 3/2011 | Jiang | G06F 16/957 |
| | | | 715/234 |
| 2011/0138288 A1 * | 6/2011 | Blum | G06F 16/958 |
| | | | 715/733 |
| 2011/0225243 A1 * | 9/2011 | Almeida | G06F 9/52 |
| | | | 709/205 |
| 2013/0006724 A1 * | 1/2013 | Simanek | G06Q 30/0251 |
| | | | 705/13 |
| 2013/0091513 A1 * | 4/2013 | Underdal | G06F 9/4843 |
| | | | 719/328 |
| 2013/0144948 A1 * | 6/2013 | Carriero | G06F 17/00 |
| | | | 709/204 |
| 2014/0089947 A1 * | 3/2014 | Han | G06F 9/54 |
| | | | 719/328 |
| 2014/0282240 A1 * | 9/2014 | Flynn, III | G06F 9/451 |
| | | | 715/810 |
| 2014/0298249 A1 * | 10/2014 | Lee | G06F 9/451 |
| | | | 715/781 |
| 2017/0102966 A1 * | 4/2017 | Dallala | G06F 9/4843 |
| 2017/0279869 A1 * | 9/2017 | Neagu | H04L 67/02 |

FOREIGN PATENT DOCUMENTS

| | | |
|---|---|---|
| CN | 102193793 A | 9/2011 |
| CN | 103475744 A | 12/2013 |
| CN | 103530160 A | 1/2014 |
| CN | 103677804 A | 3/2014 |
| CN | 104731598 A | 6/2015 |
| CN | 105759962 A | 7/2016 |
| CN | 106502736 A | 3/2017 |

OTHER PUBLICATIONS

Tencent Technology, IPRP, PCT/CN2017/112060, May 28, 2019, 6 pgs.
Tencent Technology, ISR, PCT/CN2017/112060, Feb. 22, 2018, 2 pgs.

* cited by examiner

METHOD AND DEVICE FOR PROCESSING APPLICATION PROGRAM PAGE ACCORDING TO A COMMON INTERFACE CONTAINER

CROSS-REFERENCE TO RELATED APPLICATIONS

This application is a continuation application of PCT/CN2017/112060, entitled "METHOD AND DEVICE FOR PROCESSING APPLICATION PROGRAM PAGE, AND STORAGE MEDIUM" filed on Nov. 21, 2017, which claims priority to China Patent Application No. 201611062086.6, filed with the Chinese Patent Office on Nov. 25, 2016 and entitled "METHOD AND DEVICE FOR PROCESSING APPLICATION PROGRAM PAGE, AND STORAGE MEDIUM", both of which are incorporated herein by reference in their entirety.

FIELD OF THE TECHNOLOGY

Embodiments of the present disclosure relate to the field of computer technologies, and in particular, to an application page processing method and apparatus and a storage medium.

BACKGROUND OF THE DISCLOSURE

An application is a code instruction sequence that may be executed by a terminal having an information processing capability such as a computer to obtain a result or a symbolized instruction sequence or symbolized sentence sequence that may be automatically converted into a code instruction sequence. Currently, a user may install various applications, such as a photography application, a social networking application, or an email application, on a terminal, so as to implement various functions, such as a photography function, a social function, or an email management function, by using these applications installed on the terminal. An application page is generated after an application starts. After an instruction of switching an application page from a user is received, a new application page is loaded.

SUMMARY

Based on the above, embodiments of this application provide an application page processing method and apparatus and a storage medium.

A first aspect of this application provides an application page processing method performed at a terminal having one or more processors and memory storing programs to be executed by the one or more processors, the method comprising:

running a parent application on an operating system of the terminal;

generating, by the parent application, a common page container by using a common resource of a plurality of sub-application pages, the common resource comprising page data that the plurality of sub-application pages commonly have;

in response to an event of launching a first sub-application page, loading an independent resource of the first sub-application page in the common page container, the independent resource comprising page data in the first sub-application page other than the common resource; and generating and displaying the first sub-application page according to the common page container.

A second aspect of this application further provides a terminal, comprising one or more processors; memory coupled to the one or more processors; and a plurality of computer programs stored in the memory that, when executed by the one or more processors, cause the terminal to perform the aforementioned application page processing method.

A third aspect of this application further provides a non-transitory computer readable storage medium storing a plurality of instructions in connection with a terminal having one or more processors, wherein the plurality of instructions, when executed by the one or more processors, cause the terminal to perform the aforementioned application page processing method.

DESCRIPTION OF EMBODIMENTS

To make the objectives, technical solutions, and advantages of the embodiments of the present disclosure clearer and more comprehensible, the following further describes the embodiments of the present disclosure in detail with reference to the accompanying drawings and embodiments. It should be understood that the specific embodiments described herein are merely used for explaining the embodiments of the present disclosure but are not intended to limit the embodiments of the present disclosure.

Figure 1A:
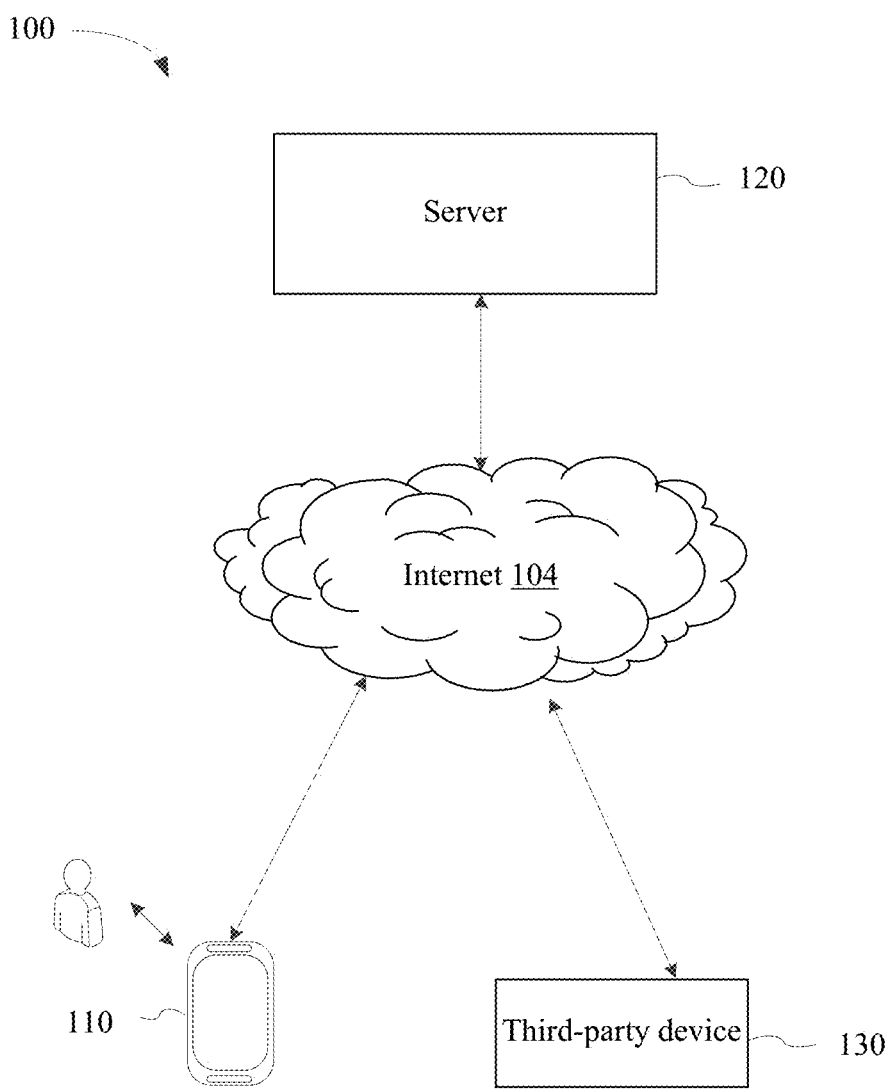
FIG. 1A is a diagram of a system according to an embodiment of this application.

FIG. 1A is a schematic diagram of a system according to an embodiment of this application. As shown in FIG. 1A, the system 100 may include a terminal 110, a server 120, and a network 104. In the embodiments, the system 100 may include a plurality of terminals. Solutions of the embodiments are described by using only the terminal 110 as an example in FIG. 1A.

Figure 1B:
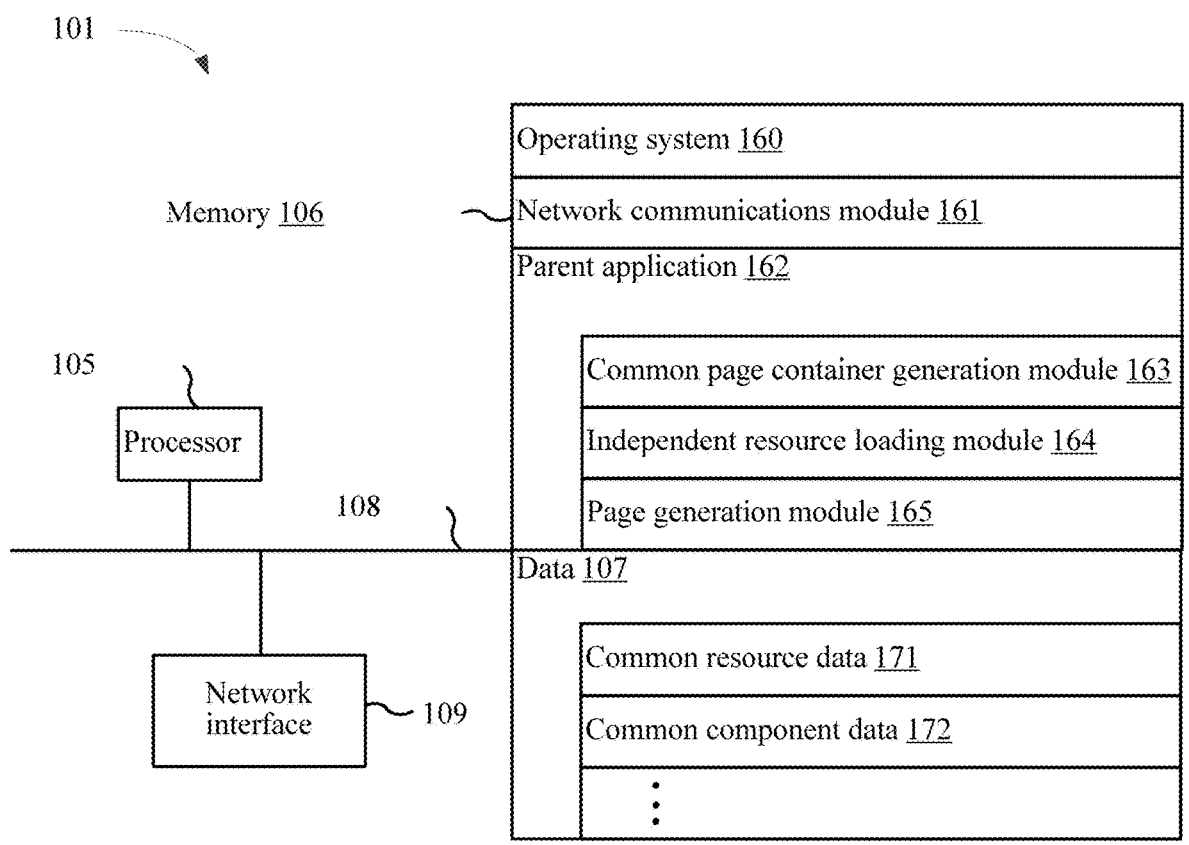
FIG. 1B is a schematic diagram of a terminal according to an embodiment of this application.

The terminal 110 may communicate with the server by using the network 104 to obtain a service provided by the server. The terminal 110 may be a terminal device such as a smartphone, a tablet computer, a laptop computer, and a PC. FIG. 1B is a schematic diagram of a terminal according to an embodiment of this application. As shown in FIG. 1B, the terminal 110 may include a processor 105, a memory 106, and a network interface 109. Components may communicate by using an interconnection mechanism 108.

The terminal 110 may be connected to the network 104 by using the network interface 109 and communicate with other devices in the network 104.

The processor 105 may include one or more processors. Each processor may be a single-core processor or a multi-core processor. The processor 105 may implement various functions by executing a computer readable instruction stored in the memory 106.

The memory 106 may include one or more storage devices. The memory 106 may include an operating system 160, a network communications module 161, a parent application 162, and a data 107. The parent application 162 may be an application run on the operating system 160. The parent application 162 may communicate with the server by using the network 104 and obtain data from the server, to provide a service to a user of the terminal 110.

In some embodiments, the parent application 162 may provide an entrance to an application (referred to as a sub-application hereinafter) outside the parent application 162 and run a sub-application in the parent application 162. In some examples, the parent application is provided by the server 120, and the sub-applications may be respectively provided by a plurality of third-party devices 130. In this way, the parent application 162 and the sub-applications may be mutually independently developed, and the sub-applications may be spread in a platform provided by the parent application 162. For example, the parent application 162 may be an instant messaging application, a social networking application, or the like; the sub-applications may be various applications that provide various services to working, living, and entertainment of a user and may provide various services such as exchange rate query, dictionaries, notebooks, agenda reminding, and takeaway ordering.

In some embodiments, the sub-application may provide a service to the user in a form of a web page (such as an HTML5 page, H5 for short, page). In this case, the parent application 162 may open a page corresponding to the sub-application by using embedded browser code and execute processing logic in page data, to provide a function of the sub-application to the user. One sub-application may correspond to one or more pages, and these pages are collectively referred to as sub-application pages.

In the embodiments, the parent application 162 may include a common page container generation module 163, an independent resource loading module 164, and a page generation module 165.

The common page container generation module 163 may generate a common page container. For example, the data 107 stored in the memory 106 may include common resource data 171. The common page container generation module 163 may obtain a common resource from the common resource data 171 and generate the common page container by using the common resource.

The independent resource loading module 164 may load an independent resource of a sub-application page in the common page container. For example, in response to an event of launching a first sub-application page, an independent resource of the sub-application page is loaded in the common page container.

The page generation module 165 may generate and display the sub-application page by using the common page container in which the independent resource is loaded.

The common resource refers to page data that a plurality of sub-application pages commonly have. The common resource may be data that is preset in the parent application and that is used for providing basic functions of the sub-application page. For example, the common resource may include a rendering engine, a common code library, a software development kit (SDK), or the like. Code in the common code library may include script code, native language code, markup language code, and the like. The markup language code may include HyperText Markup Language (HTML) code, Cascading Style Sheets (CSS) code, and the like. The script code may include JavaScript code and the like.

The common page container is data of a page. The common page container generated by using the common resource corresponds to a blank page. The blank page may have basic page functions, and these basic page functions are provided by the common resource. The common page container may further include a code instruction, such as instruction code of the rendering engine, for generating the sub-application.

The independent resource of the sub-application page is page data in the sub-application page other than the common resource. In some examples, the independent resource may be page data provided by a developer of the sub-application. The developer of the sub-application may be a third-party service provider different from a developer of the parent application. The independent resource may include page layout data, page component data, processing logic code, and the like. After the independent resource of the sub-application page is loaded in the common page container, data corresponding to the common page container is data of the sub-application page. The common page container in which the independent resource is loaded is used for page rendering, so that rendering data of the sub-application page is generated, and the sub-application page is displayed on a display device. The independent resource loading module 164 may obtain the independent resource from the server 120 or third-party device 130. For example, the third-party device 130 may provide the independent resource of the sub-application page to the server 120, and the server 120 stores the independent resources of the sub-application pages, and when receiving an obtaining request from the terminal 110, provides a requested independent resource to the terminal 110. For another example, the terminal 110 may obtain information about the third-party device corresponding to the sub-application from the server and obtain the independent resource of the sub-application page from the third-party device according to the information. Examples are provided herein. Different manners of obtaining the independent resource may be used in other embodiments.

Figure 1C:
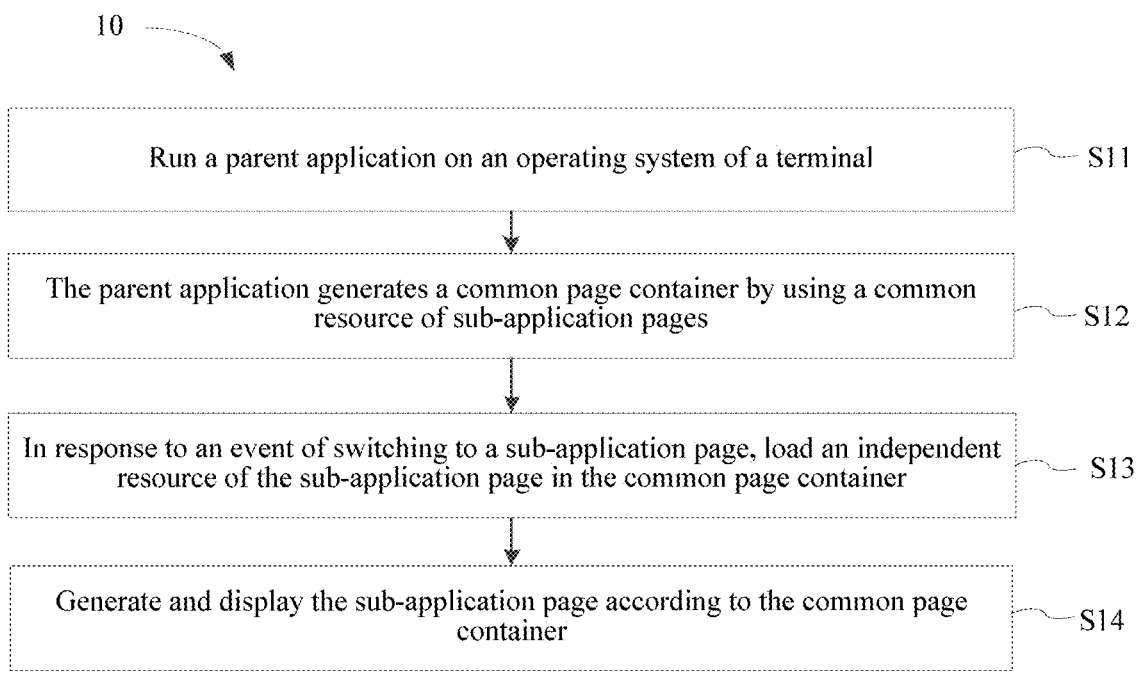
FIG. 1C is a flowchart of an application page processing method according to an embodiment of this application.

FIG. 1C is a flowchart of an application page processing method according to an embodiment of this application. The method 10 may be performed by the terminal 110. As shown in FIG. 1C, the method may include the following steps.

S11: Run a parent application on an operating system of the terminal.

S12: The parent application generates a common page container by using a common resource of a plurality of sub-application pages, the common resource including page data that the plurality of sub-application pages commonly have.

S13: In response to an event of launching a first sub-application page, load an independent resource of the sub-application page in the common page container, the independent resource including page data in the sub-application page other than the common resource.

Pages of sub-applications are collectively referred to as a sub-application page.

In the embodiments, the event of launching a first sub-application page may refer to receiving an instruction of running the first sub-application that is sent by the user in an interface of the parent application, or receiving an instruction of switching to a page of the first sub-application that is sent by the user in another page of the first sub-application, or receiving an instruction of switching to the first sub-application that is sent by the user in a page of another sub-application.

In the embodiments, when the event is an event of launching the first sub-application that is not currently run, an independent resource of a default page (such as a home page and a welcome page) of the first sub-application may be loaded in the common page container.

S14: Generate and display the first sub-application page according to the common page container.

A terminal device generates page rendering data according to the common page container in which the independent resource of the sub-application page is loaded, to render the corresponding sub-application page by using the page rendering data.

Figure 1D:
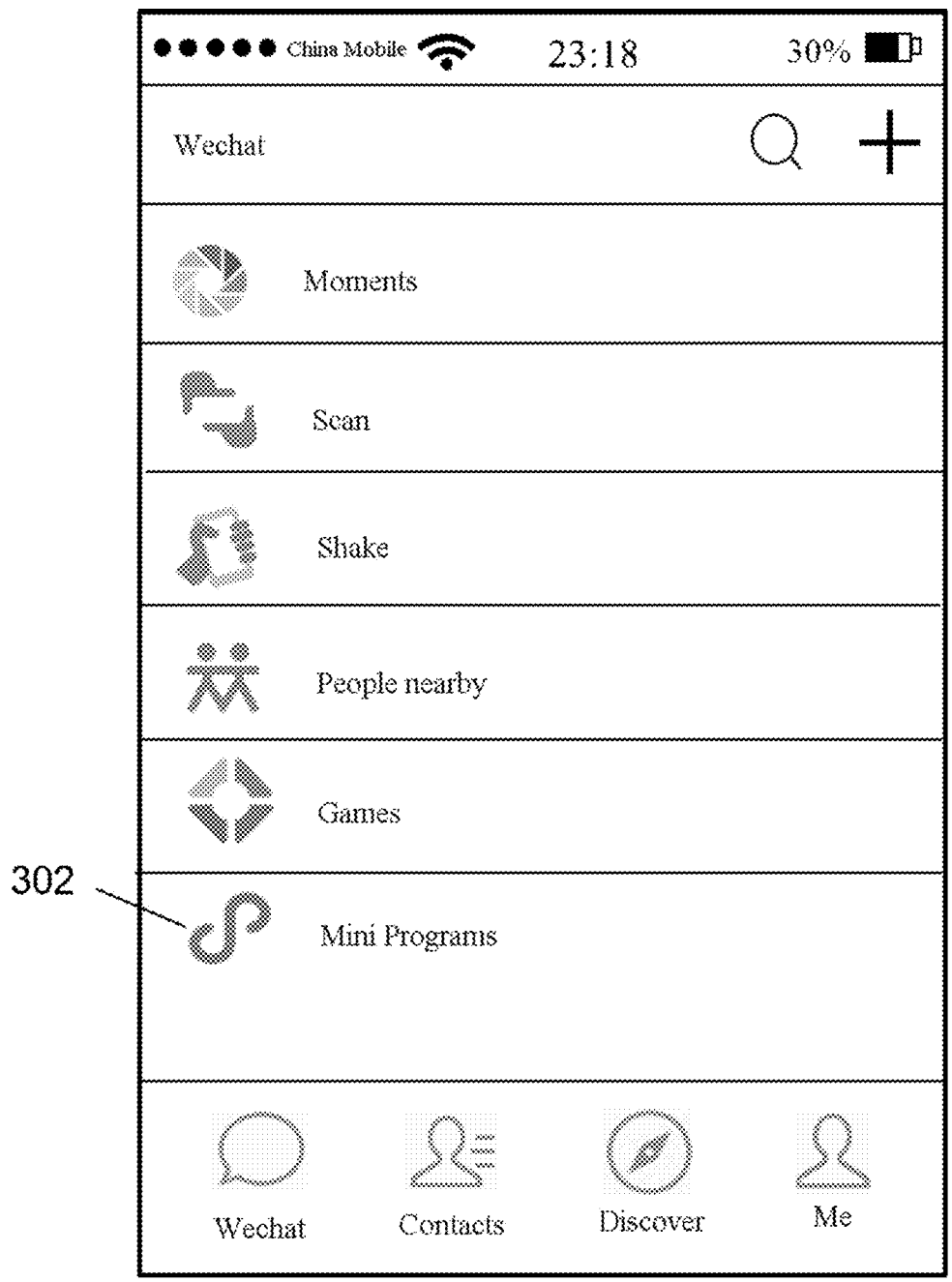
FIG. 1D shows a first user interface of a parent application according to an embodiment of this application.

For example, a parent application may be run in the terminal 110, and the parent application is presented as a first user interface of the parent application shown in FIG. 1D. The parent application may generate the common page container by using the common resource of the sub-application pages. In this case, the common page container corresponds to data of a blank page. For example, the blank page may be shown in FIG. 1F. The blank page is not displayed on the display device of the terminal 110 but is temporarily stored in a memory of the terminal 110 in a form of the common page container. In the blank page, parts 305 and 306 are both page components provided by the common resource, and the sub-application pages all have these parts. The blank page further includes processing logic corresponding to the part 306. When a click event of the part 306 is received, a popup window 307 may be presented according to the processing logic. Components of the popup window 307 and processing logic of the popup window 307 are also predefined in the common resource.

Figure 1E:
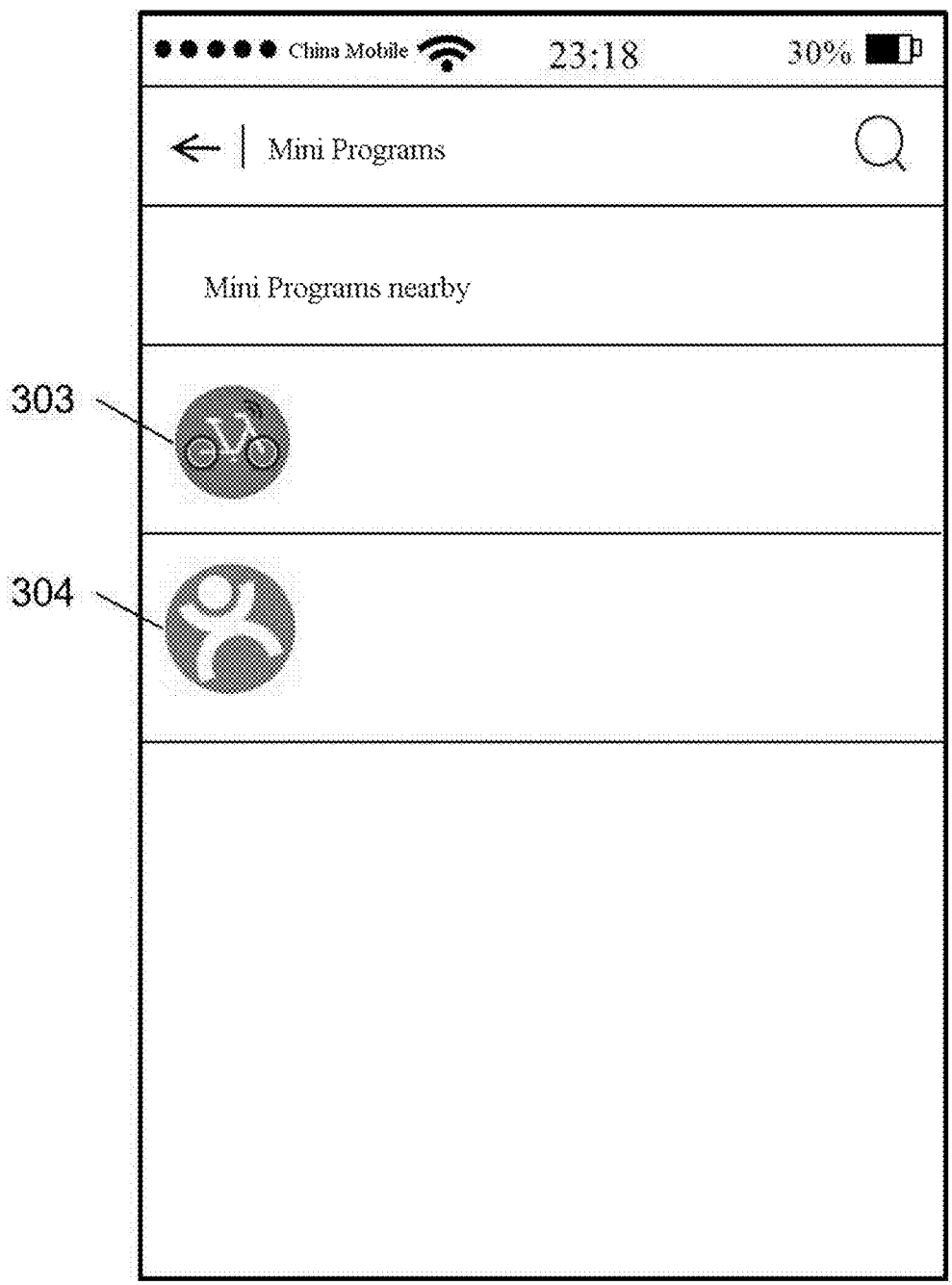
FIG. 1E shows a second user interface of a parent application according to an embodiment of this application.
Figure 1F:
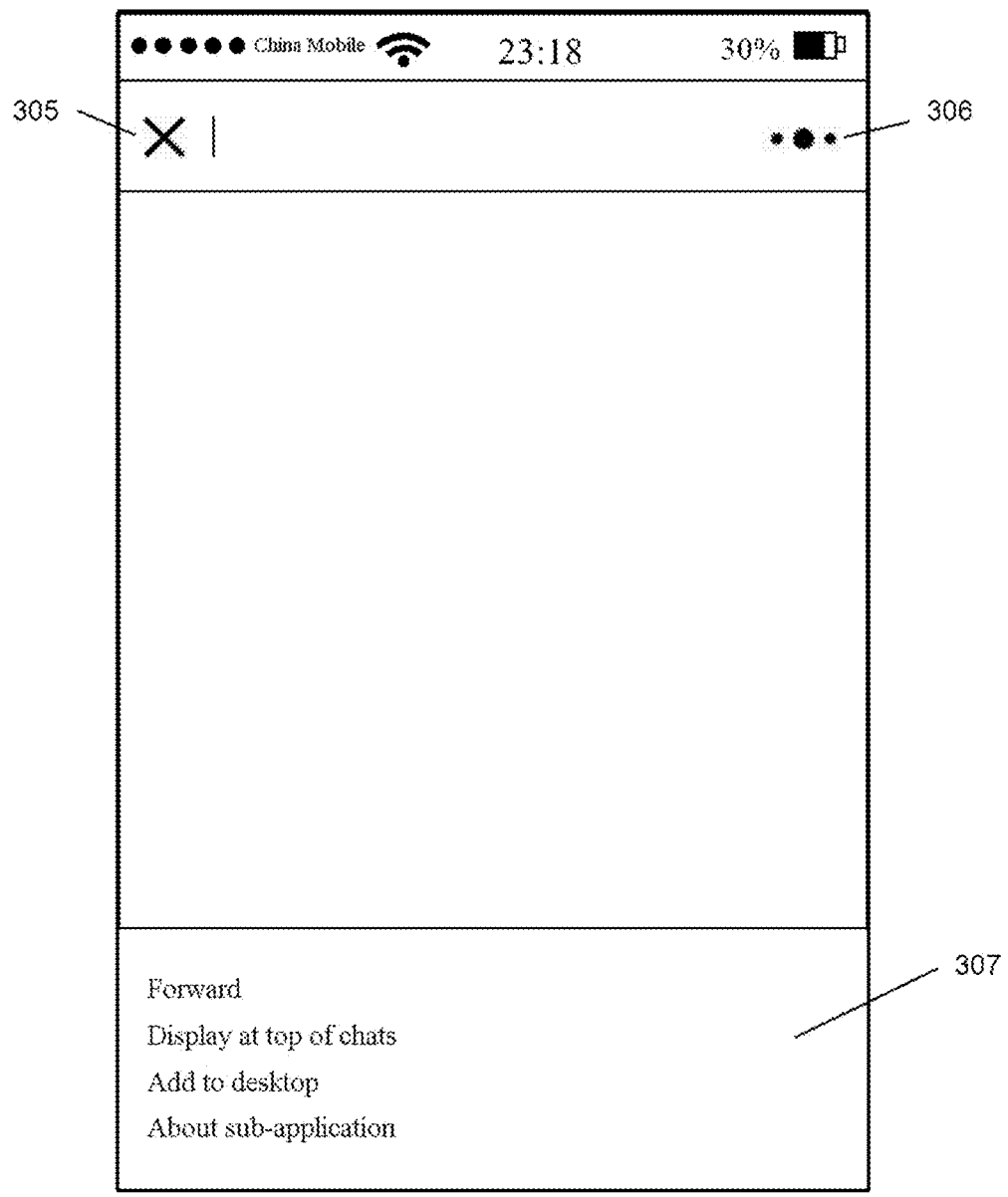
FIG. 1F is a schematic diagram of a blank page corresponding to a common page container according to an embodiment of this application.

In response to a click event of an interface component 302 in the first user interface, the terminal 110 is presented as a second user interface of a parent application shown in FIG. 1E. A sub-application list is presented in the second user interface. The list includes an entrance 303 of a first sub-application and an entrance 304 of a second sub-application. In this example, the first sub-application is a shared bicycle application, and the second sub-application is a third-party consumer review application.

Figure 1G:
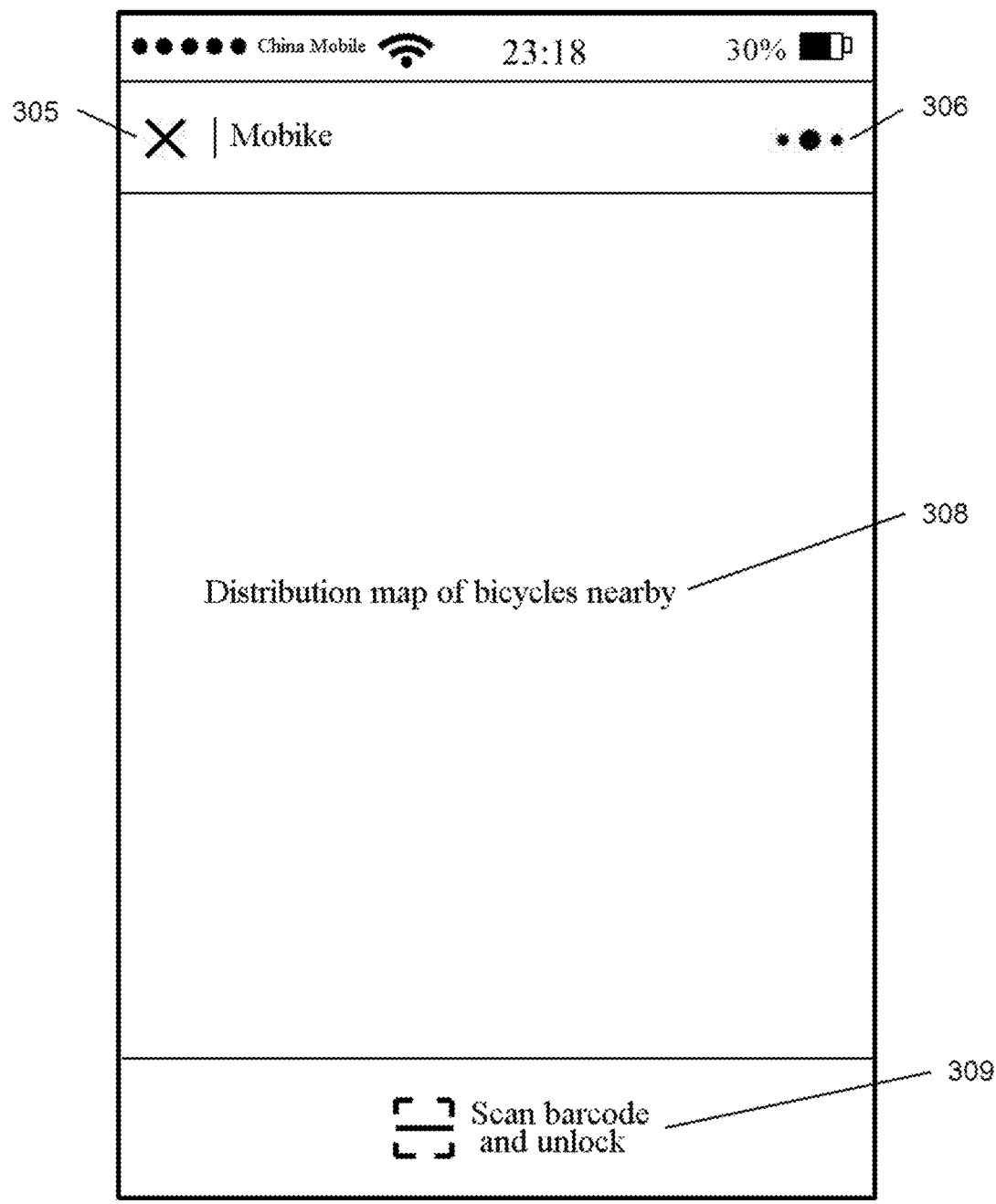
FIG. 1G is a schematic structural diagram of a sub-application page according to an embodiment of this application.

In response to a click event of the entrance 303 of the first sub-application in the second user interface (that is, an event of switching to a page of the first sub-application), the parent application may load an independent resource of a first sub-application page in the common page container and generate rendering data by using the common page container in which the independent resource is loaded, so that the terminal 110 presents the first sub-application page shown in FIG. 1G. In some examples, the parent application may obtain the independent resource of the first sub-application page from the server, and the independent resource may include data of the page component and processing logic of a page. As shown in FIG. 1G, the page component included in the independent resource includes a component 307, a component 308, and processing logic of the page component. The parent application runs processing logic of the component 307, obtains a distribution map of shared bicycles around a current location of the terminal 110 from a third-party device, and presents the distribution map in the component 307. When receiving a click event of the component 308, the parent application runs processing logic of the component 308 and calls a camera in the terminal 110 and barcode scanning logic in the parent application, implementing barcode scanning and unlocking of shared bicycles.

In this embodiment of this application, the parent application generates the common page container by using the common resource of the plurality of sub-application pages in advance, and when detecting an event of launching a first sub-application page, then loads an independent resource of the sub-application page in the common page container, thereby improving running efficiency of a sub-application.

Figure 2:
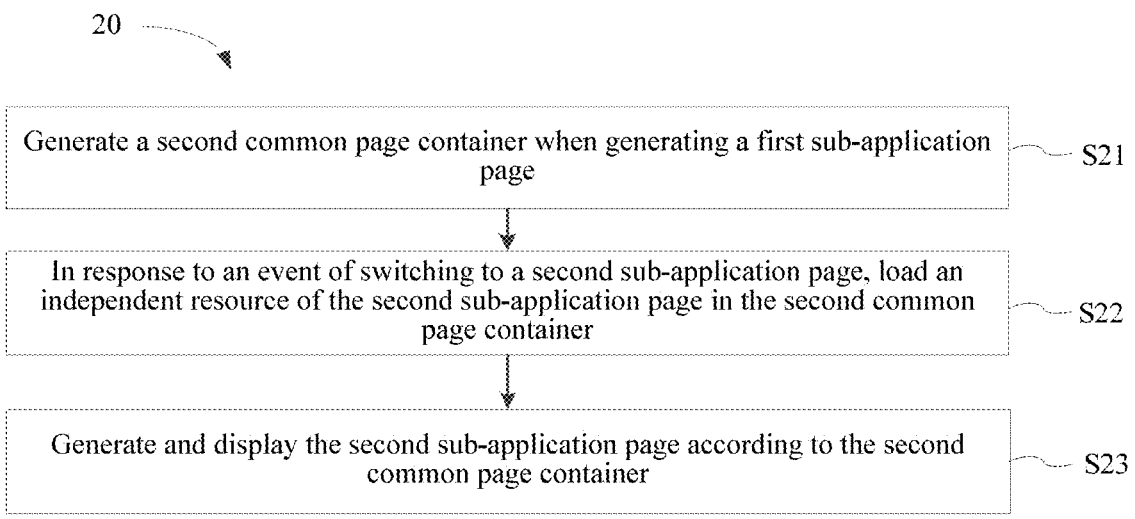
FIG. 2 is a flowchart of an application page processing method according to an embodiment of this application.

In some examples, when the first sub-application page is generated, the parent application may be prepared for subsequent possible page switching. FIG. 2 is a flowchart of an application page processing method according to an embodiment of this application. The method 20 may include the following steps.

S21: Generate a second common page container when generating a first sub-application page.

S22: In response to an event of switching to a second sub-application page, load an independent resource of the second sub-application page in the second common page container.

S23: Generate and display the second sub-application page according to the second common page container.

In some examples, when the second common page container is generated, the second common page container may be created by using the common resource. That is, a new common page container is created as the second common page container.

In some examples, when the second common page container is generated, a second independent resource may be removed from a third common page container in which the second independent resource is loaded, to obtain the second common page container. That is, an existing common page container is reused.

For example, the parent application creates two common page containers, for example, a first common page container and the third common page container.

In response to an event of switching to a first sub-application page, a first independent resource of the first sub-application page is loaded in the first common page container.

In response to an event of switching to a second sub-application page, a second independent resource of the second sub-application page is loaded in the third common page container.

In response to an event of switching to a third sub-application, a first independent resource is removed from the first common page container (a second common page container is used herein to indicate the first common page container from which the first independent resource is removed), and a third independent resource of a third sub-application page is loaded in the second common page container.

In some examples, when an event of launching a first sub-application page is an event of launching a first sub-application page of a sub-application that is not currently run, an independent resource of a default sub-application page of the sub-application may be obtained, and the default sub-application page is generated and displayed.

The default sub-application page is a sub-application page that is entered by default when the first sub-application is started, may be a sub-application page designated by a third party when the first sub-application is developed, or may be a sub-application page when the first sub-application is exited after use last time. When an event of launching the first sub-application is detected, an identifier of the first sub-application is obtained, a page identifier of a default sub-application page of the first sub-application is obtained according to the identifier of the first sub-application, and an independent resource of the default sub-application page is found according to the page identifier of the default sub-application page.

The independent resource of the default sub-application page may be obtained from the server 120 or the third-party device 130 corresponding to the sub-application or may be obtained from the terminal 110. The independent resource of the default sub-application page may be downloaded to the terminal 110 and be saved in the terminal 110 when the sub-application is run for the first time. The saved independent resource may be updated after an update notification of the server or third-party device is received or may be updated by the parent application through query from the server or third-party device at a preset time interval.

In some examples, when obtaining the independent resource of the sub-application page, the parent application may obtain a configuration file of a sub-application page provided by the third-party device from the server and obtain page component information of the sub-application page from the configuration file. Data of page components is obtained according to the page component information, and the data of the page components is loaded in the common page container.

The configuration file of the sub-application page is a file for describing the sub-application page. The configuration file of the sub-application page may be source code or a file obtained after source code is complied. The configuration file may include information about components included in the sub-application page, and components in the sub-application page may be determined according to the configuration file of the sub-application page. The parent application may obtain the configuration file of the sub-application page from the terminal 110, the server 120, or the third-party device 130.

In some examples, when obtaining the data of the page components according to the page component information, the parent application may obtain a common component identifier in the sub-application page from the configuration file and load data of a common component corresponding to the common component identifier in the parent application in the common page container.

The common component is a page component that is provided by the parent application and that may be commonly used by different sub-applications. The page component may include a display component and/or processing logic. The parent application may obtain the common component data 172 from data stored in the memory 106 of the terminal 110. The sub-application may use, by including information about the common component in the configuration file, the common component provided by the parent application.

In some examples, in response to an operation on the common component in the sub-application page, the parent application may execute processing logic corresponding to the common component. For example, logic code for processing an event triggered by the common component is encapsulated in some common components. When the common component is a control, when the control is clicked, the parent application may execute the logic code encapsulated in the control, to perform corresponding operations.

In some examples, when obtaining the independent resource of the sub-application page, the parent application may obtain from the server business logic code of the sub-application page provided by the third-party device, obtain business data by running the business logic code, and load the business data in the common page container. The business logic code is code of processing logic included in the sub-application page. The business logic code may be native language code or script code. The script code is, for example, JavaScript code. The business logic code may be obtained locally or from the server. The business logic code is provided by the third-party device that develops the sub-application, and the third-party device uploads the business logic code of the sub-application page to the server.

Figure 3A:
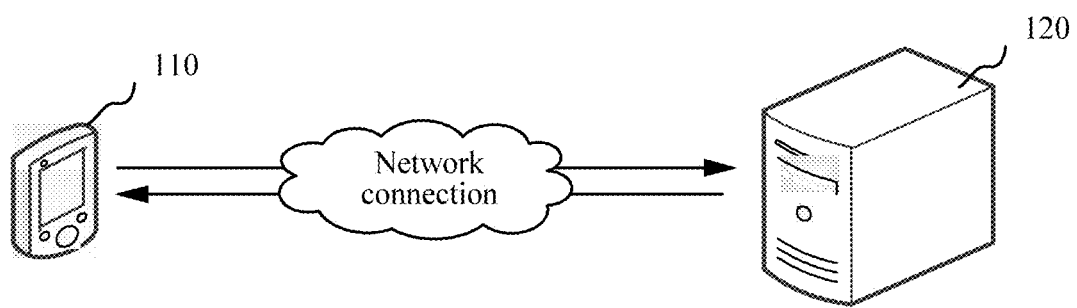
FIG. 3A is a diagram of an application environment of an application processing system according to an embodiment of the present disclosure.

FIG. 3A is a diagram of an application environment of an application processing system according to an embodiment of this application. Referring to FIG. 3A, the application processing system includes a terminal 110 and a server 120.

A file that is needed to generate a sub-application page is stored on the server 120, and the file is, for example, a sub-application global logic file corresponding to a sub-application identifier, a sub-application global configuration file, a sub-application page configuration file, and a page pattern file. Page preloading configuration information is also stored on the server 120. The page preloading configuration information records a preloading relationship between the sub-application pages. For example, the preloading relationship may include preloading a sub-application page 2 when a sub-application page 1 is presented, preloading a sub-application page 3 when the sub-application page 2 is presented, and the like.

An operating system is run on the terminal 110, and a parent application is run on the operating system. The terminal 110 performs the application page processing method by using the parent application, to implement the sub-application page by using the parent application. The terminal 110 may specifically create a sub-application logic layer processing unit and a corresponding sub-application view layer processing unit by using the parent application. The sub-application view layer processing unit may be configured to generate a sub-application page.

In an embodiment, the terminal 110 may preload a common resource of different sub-application pages as a common page container by using the sub-application logic layer processing unit, determine a page identifier having a preloading relationship with a sub-application page identifier (referred to as a page identifier hereinafter) of the generated sub-application page, and load an independent resource of a sub-application page corresponding to the determined page identifier in the common page container. The terminal 110 may obtain an event of launching a first sub-application page corresponding to the determined page identifier by using the sub-application view layer processing unit and transfer the event to the sub-application logic layer processing unit. The sub-application logic layer processing unit makes a response to the event, and transfers page rendering data that is generated according to the common page container in which the independent resource of the sub-application page is loaded to the sub-application view layer processing unit. The terminal 110 may generate the sub-application page by using the sub-application view layer processing unit and according to the page rendering data.

Figure 3B:
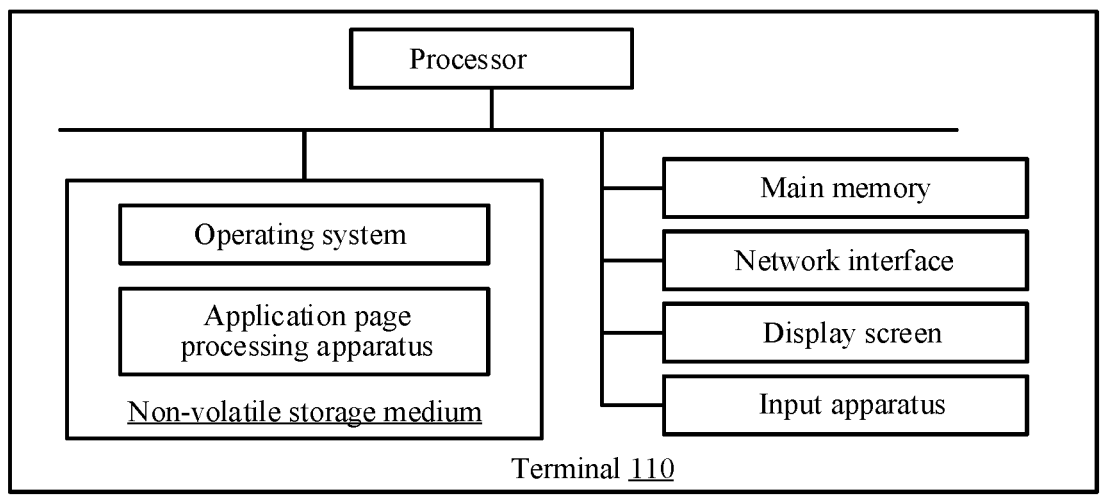
FIG. 3B is a schematic diagram of an internal structure of a terminal according to an embodiment of the present disclosure.

FIG. 3B is a schematic diagram of the internal structure of a terminal according to an embodiment. Referring to FIG. 3B, the terminal 110 includes a processor, a non-volatile storage medium, a main memory, a network interface, a display screen, and an input apparatus that are connected by using a system bus. The non-volatile storage medium of the terminal stores an operating system and further stores an application page processing apparatus. The application page processing apparatus is configured to perform an application page processing method. The processor of the terminal is configured to provide computing and control capabilities, to support running of the entire terminal. The main memory in the terminal provides an environment to running of the application page processing apparatus in the non-volatile storage medium. The main memory may store a computer readable instruction. When being executed by the processor, the computer readable instruction may cause the processor to perform an application page processing method. The network interface of the terminal is configured to perform network communication with a server, for example, download page preloading configuration information. The display screen of the terminal may be a liquid crystal display screen or an e-ink display screen. The input apparatus of the terminal may be a touch layer covering the display screen, or may be a key, a track ball, or a touchpad disposed on a housing of the terminal, or may be an external keyboard, touchpad, or mouse. The terminal may be a personal computer or a mobile terminal, and the mobile terminal is, for example, a mobile phone, a tablet computer, a personal digital assistant, or a wearable device. A person skilled in the art may understand that, in the structure shown in FIG. 3 B, only a block diagram of a partial structure related to a solution in this application is shown, and does not constitute a limitation to the terminal to which the solution in this application is applied. Specifically, the terminal may include more components or fewer components than those shown in FIG. 3B, or some components may be combined, or a different component deployment may be used.

Figure 3C:
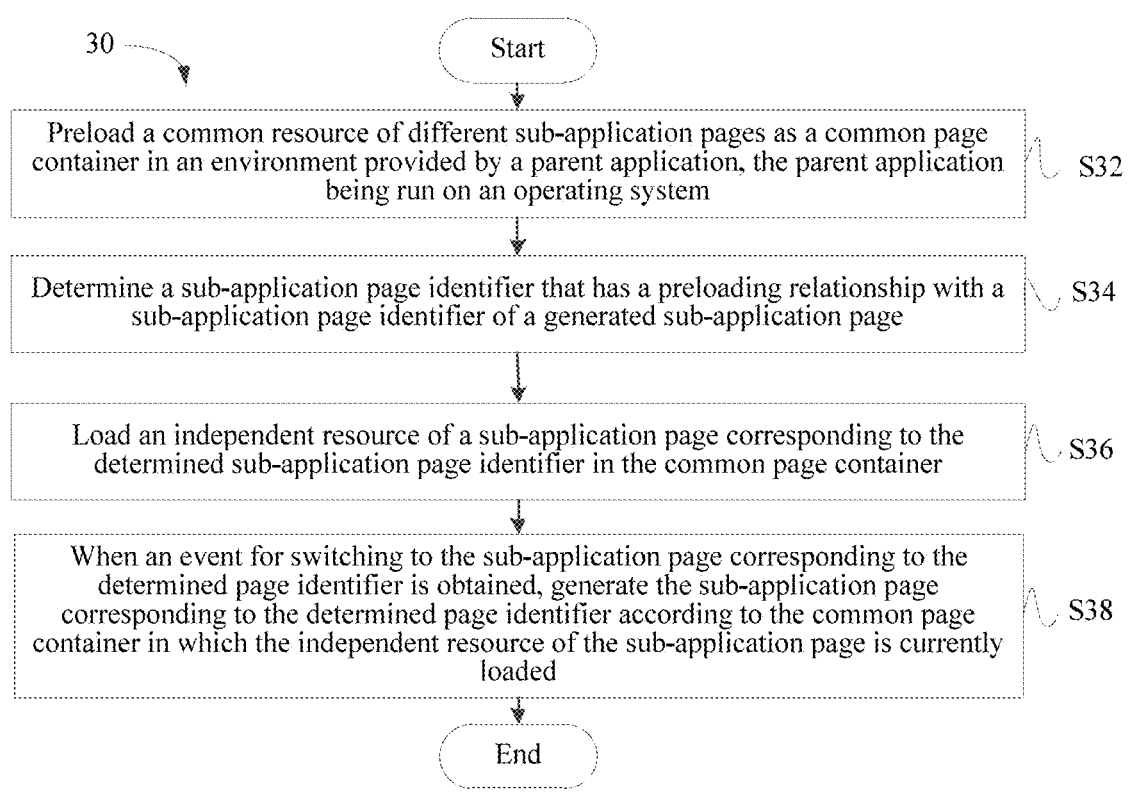
FIG. 3C is a schematic flowchart of an application processing method according to an embodiment of the present disclosure.

FIG. 3C is a schematic flowchart of an application processing method 30 according to an embodiment. This embodiment is described by using an example in which the method is applied to the terminal 110 in FIG. 3B. The method 30 may include the following steps.

S32: Preload a common resource of different sub-application pages as a common page container in an environment provided by a parent application, the parent application being run on an operating system.

In the embodiments, "preloading a common resource as a common page container in an environment provided by a parent application" means that the parent application generates the common page container by using the common resource of the sub-application page before obtaining an event for launching a first sub-application page.

Figure 4:
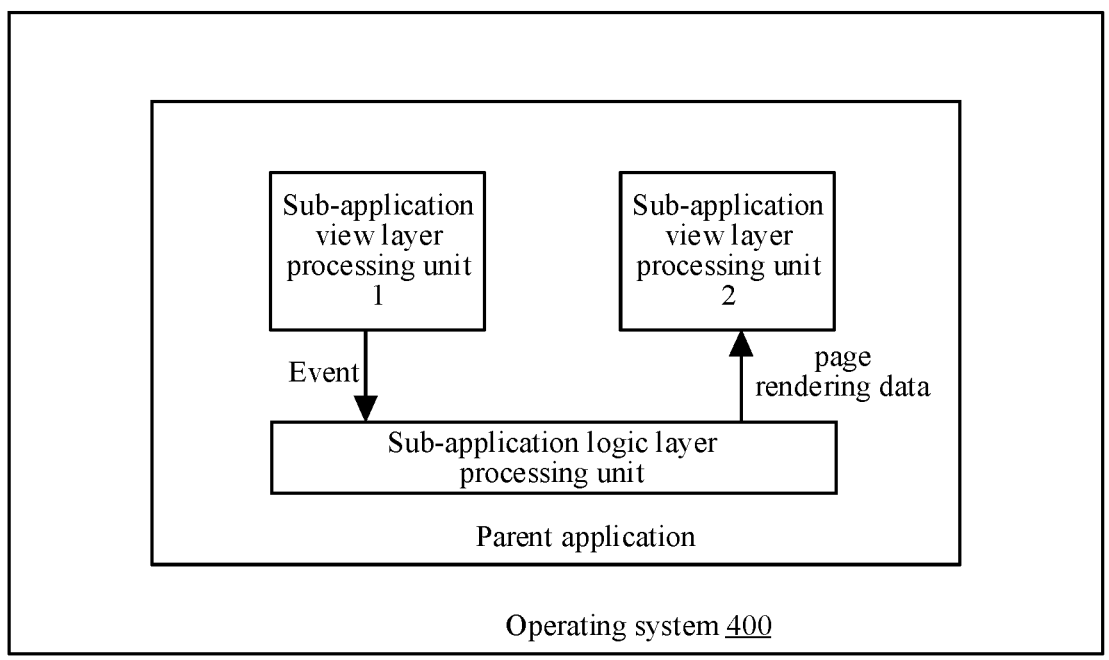
FIG. 4 is a schematic diagram of relationships between an operating system, a parent application, a sub-application, and a sub-application page according to an embodiment of the present disclosure.

Referring to FIG. 4, the operating system 400 is run on the terminal, the parent application is run on the operating system, the sub-application page is generated in the environment provided by the parent application, and the sub-application page implements a function of a sub-application. The operating system (OS for short) is a computer program that manages and controls hardware and software resources of the terminal and is most basic system software that is directly run on a bare computer of the terminal; an application needs to be run under support of the operating system.

The parent application is an application carrying the sub-application and provides an environment to implementation of the sub-application. The parent application is a native application. The native application is an application that may be directly run on the operating system. The sub-application is an application that may be implemented in the environment provided by the parent application. The parent application and the sub-application may be mutually independently developed.

The parent application may be a social networking application, a dedicated application that is dedicatedly used for supporting a sub-application, a file management application, an email application, a game application, or the like. The social networking application includes an instant messaging application, a social network service (SNS) application, a live broadcast application, or the like. The sub-application may be specifically a social networking application program, a file management application, an email application, a game application, or the like.

The common resource, such as a rendering engine, a common code library, or a software development kit (SDK), is a resource that is commonly used by generation of different sub-application pages. Code in the common code library is, for example, script code, native language code, or markup language code. The markup language code is, for example, HyperText Markup Language (HTML) code or cascading style sheets (CSS) code. The script code is, for example, JavaScript code.

The common page container can be used for generating a blank sub-application page. After content in the sub-application page is loaded in the common page container, the common page container may be used for generating the corresponding sub-application page. The common resource is preloaded as the common page container, and a developer of the sub-application does not need to pay attention to a dependency relationship between the common resources and may directly use content provided by the common page container.

S34: Determine a sub-application page identifier that has a preloading relationship with a sub-application page identifier of a generated sub-application page.

That the determined sub-application page identifier of a sub-application page has a preloading relationship with the sub-application page identifier of the generated sub-application page means that a sub-application page represented by the determined sub-application page identifier on the premise of the generated sub-application page is preloaded. The generated sub-application page may be a sub-application page that is being presented. The sub-application page mentioned in this embodiment of the present disclosure corresponds to the same sub-application identifier if not especially described. In an embodiment, the generated sub-application page may be generated before step S32.

In an embodiment, the preloading relationship between the sub-application page identifiers may be configured by an account having configuration permission, and the account having configuration permission is, for example, an account of a developer of the parent application or an account of a developer of the sub-application.

In an embodiment, the preloading relationship between the sub-application page identifiers may be determined according to content correlation between the corresponding sub-application pages, and the content correlation may be obtained by calculating page similarity between the corresponding sub-application pages.

S36: Load an independent resource of a sub-application page corresponding to the determined sub-application page identifier in the common page container.

The independent resource of the sub-application page is different from the common resource between the different sub-application pages and is a difference between the different sub-application pages. The independent resource of the sub-application page corresponding to the determined page identifier is a difference between the sub-application page represented by the determined page identifier and other sub-application pages. The difference is not limited to difference between presented content and may further include a logic difference and a page structure difference.

The independent resource of the sub-application page cooperates with the common resource, to together generate the sub-application page. The independent resource of the sub-application page may include business logic code, a page element identifier, business data, or the like. The business logic code is logic code for implementing business of the sub-application, and the business data is data that is needed to implement business of the sub-application.

In an embodiment, the independent resource of the sub-application page corresponding to the page identifier may be immediately downloaded from the server or may be locally read, for example, be locally cached or be read from a local file. An independent resource of a local sub-application page may be downloaded to a local location from the server in advance.

S38: When an event for switching to the sub-application page corresponding to the determined page identifier is obtained, generate the sub-application page corresponding to the determined page identifier according to the common page container in which the independent resource of the sub-application page is currently loaded.

Specifically, the terminal may detect or monitor, by using the parent application, an event triggered in the generated sub-application page. The event for switching to the sub-application page corresponding to the determined page identifier may be specifically an event of clicking a link, an event of entering a next page, or the like.

When the event for switching to the sub-application page corresponding to the determined page identifier is detected, the terminal may generate the sub-application page by using the parent application and according to the common page container in which the independent resource of the sub-application page is loaded. The terminal may specifically generate page rendering data by using the parent application and according to the common page container in which the independent resource of the sub-application page is loaded, to render the corresponding sub-application page by using the page rendering data. The generated sub-application page becomes an already generated sub-application page.

In an embodiment, the terminal may preload a new common page container by using the parent application when or after step S38 is performed. The terminal may also cache the generated sub-application page by using the parent application.

In the foregoing application page processing method, the parent application is run on the operating system, the parent application generates the sub-application page, and the sub-application is run in a form of the sub-application page, so that the sub-application does not need to be installed, thereby reducing time consumed by installation of the sub-application and improving running efficiency of the sub-application. In addition, the common resource between different sub-application pages is preloaded as the common page container, and after a sub-application page that needs to be preloaded is determined, the independent resource of the sub-application page is further loaded, so that not all resources of the sub-application page need to be loaded every time, thereby further improving running efficiency of the sub-application through preloading.

Figure 5:
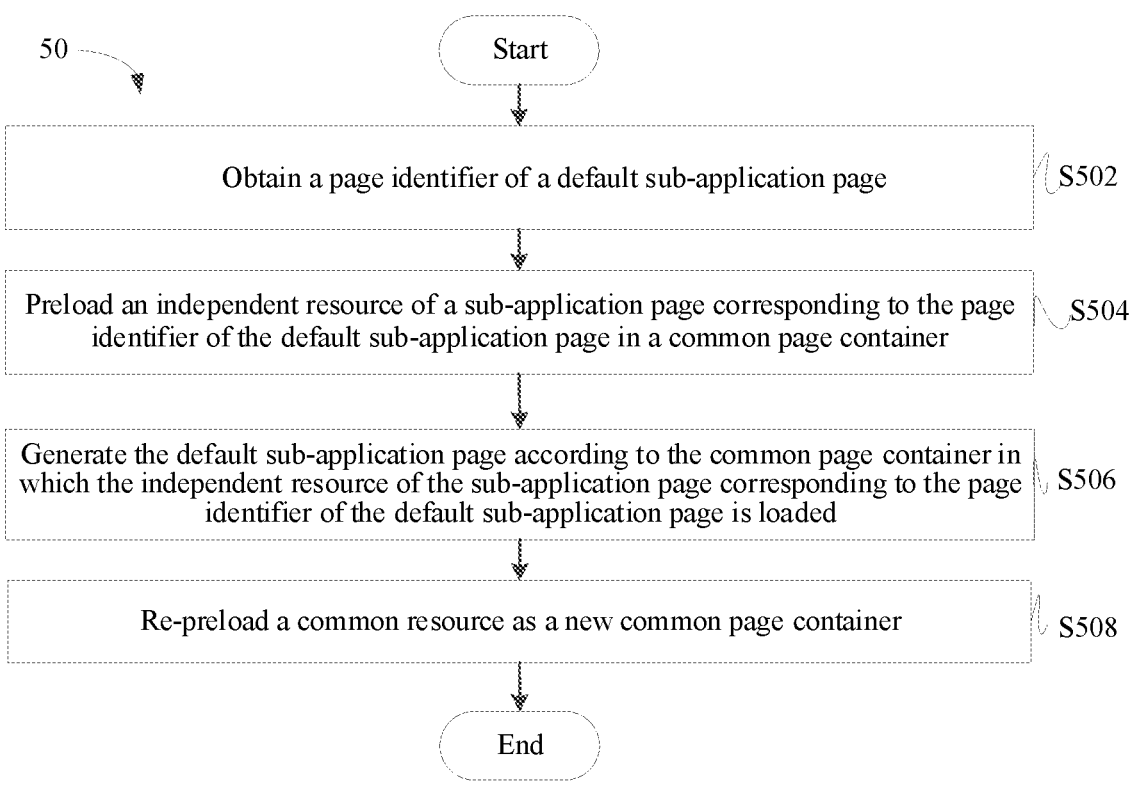
FIG. 5 is a schematic flowchart of a step of generating a default sub-application page according to a preloaded common page container and preloading a new common page container according to an embodiment of the present disclosure.

In an embodiment, after step S32 and before step S34, the application page processing method further includes steps of generating a default sub-application page according to the preloaded common page container and preloading a new common page container. Referring to FIG. 5, the method 50 may include the following steps.

S502: Obtain a page identifier of a default sub-application page.

The default sub-application page is a sub-application page that is entered by default when the sub-application is started, may be a sub-application page designated when the sub-application is developed, or may be a sub-application page when the sub-application is exited after use last time. The page identifier is used for uniquely identifying a corresponding sub-application page. The terminal may obtain a sub-application start instruction by using the parent application, to obtain a sub-application identifier designated by the sub-application start instruction, to obtain the page identifier of the default sub-application page corresponding to the sub-application identifier.

S504: Preload an independent resource of a sub-application page corresponding to the page identifier of the default sub-application page in a common page container.

The loaded independent resource of the sub-application page corresponding to the page identifier of the default sub-application page may be immediately downloaded from the server or may be locally read, for example, be locally cached or be read from a local file. An independent resource of a local sub-application page may be downloaded to a local location from the server in advance.

S506: Generate the default sub-application page according to the common page container in which the independent resource of the sub-application page corresponding to the page identifier of the default sub-application page is loaded.

Specifically, the terminal may specifically generate page rendering data according to the common page container in which the independent resource of the sub-application page corresponding to the page identifier of the default sub-application page is loaded, to render the corresponding sub-application page by using the page rendering data.

S508: Re-preload a common resource as a new common page container.

Specifically, the terminal may preload the common resource between different sub-application pages as the new common page container when the independent resource of the sub-application page is loaded in the common page container by using the parent application or when the sub-application page is generated.

In this embodiment, the common page container is preloaded, the default sub-application page is rapidly generated by using the preloaded common page container, the common resource between different sub-application pages is preloaded as the new common page container, and switching is rapidly performed between different sub-application pages by using the new common page container, thereby further improving use efficiency of the sub-application.

In an embodiment, step S34 specifically includes: obtaining page preloading configuration information configured by an account having configuration permission on the server, and searching the preloading configuration information for the page identifier that has the preloading relationship with the page identifier of the generated sub-application page.

The page preloading configuration information is configuration information of the preloading relationship between the sub-application pages, and the page preloading configuration information may record a preloading relationship between pages. The account having configuration permission is an account having permission of configuring the page preloading configuration information, such as an account of a sub-application developer.

Specifically, the server may provide a sub-application configuration page corresponding to the sub-application identifier, obtain the preloading relationship between the pages that is recorded by the sub-application configuration page, and record the obtained preloading relationship in the page preloading configuration information corresponding to the sub-application identifier on the server.

Further, the terminal may obtain the page preloading configuration information corresponding to the sub-application identifier by using the parent application form the server or locally, to search the obtained preloading configuration information for the page identifier, and the found page identifier has the preloading relationship with the page identifier of the generated sub-application page in the preloading configuration information. The local page preloading configuration information may be downloaded from the server in advance and be locally stored.

In this embodiment, the preloading relationship between the pages may be configured on the server by using the account having configuration permission, and preloading relationships between sub-application pages that are implemented on terminals by using the parent application may be conveniently and uniformly managed by using the account.

In an embodiment, step S34 specifically includes: obtaining page preloading configuration information that is configured by an account having configuration permission and that corresponds to the sub-application identifier on the server, and searching the preloading configuration information for the page identifier that has the preloading relationship with the page identifier of the generated sub-application page. The page identifier of the generated sub-application page and the found page identifier of the sub-application page both correspond to the same sub-application identifier.

In an embodiment, step S34 specifically includes: sending a query request carrying the page identifier of the generated sub-application page to the server and receiving the page identifier of the sub-application page that is found in the page preloading configuration information according to the page identifier of the generated sub-application page and that is sent by the server, where the found page identifier of the sub-application page has a preloading relationship with the page identifier of the generated sub-application page in the page preloading configuration information, and the page preloading configuration information is configured by the account having configuration permission.

In this embodiment, query from the server may be conducted according to needs to determine a sub-application page that needs to be preloaded; when the preloading relationship configured on the server changes, change of the preloading relationship can be embodied in time, thereby further improving use efficiency of the sub-application.

In an embodiment, step S34 includes: sending a query request carrying the sub-application identifier and the page identifier of the generated sub-application page to the server and receiving the page identifier of the sub-application page that is found by the server from the page preloading configuration information corresponding to the sub-application identifier, where the found page identifier of the sub-application page has a preloading relationship with the page identifier of the generated sub-application page in the page preloading configuration information, and the page preloading configuration information is configured by the account having configuration permission.

In this embodiment, the preloading relationship between the sub-application pages may be configured for different sub-applications, so that query from the server is conducted according to needs, to determine a sub-application page that needs to be currently preloaded by a current sub-application, thereby supporting preloading of a plurality of sub-applications and further improving use efficiency of the sub-applications.

Figure 6:
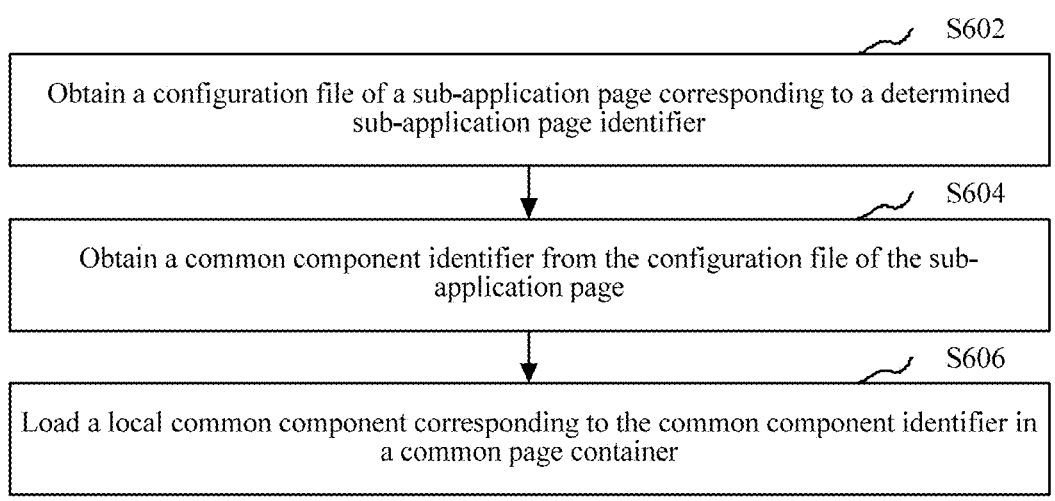
FIG. 6 is a schematic flowchart of a step of loading an independent resource of a sub-application page corresponding to a determined page identifier in a common page container according to an embodiment of the present disclosure.

As shown in FIG. 6, in an embodiment, step S36 specifically includes the following steps.

S602: Obtain a configuration file of a sub-application page corresponding to a determined sub-application page identifier.

The configuration file of the sub-application page is a file for configuring a presented page. The configuration file of the sub-application page may be source code or a file obtained after source code is complied. The page presented by the sub-application is referred to as a sub-application page, and one sub-application may include one or more sub-application pages.

Specifically, the terminal may obtain the configuration file of the sub-application page corresponding to the determined sub-application page identifier by using the parent application locally or from the server. The terminal may also obtain the sub-application identifier, to obtain the configuration file of the sub-application page corresponding to the sub-application identifier and the determined sub-application page identifier.

In an embodiment, the terminal may present a sub-application list by using the parent application, receive a selection instruction for options in the sub-application list, and determine an option selected in the sub-application list according to the selection instruction, to obtain a sub-application identifier corresponding to the selected option.

S604: Obtain a common component identifier from the configuration file of the sub-application page.

Specifically, the terminal may parse the configuration file of the sub-application page, to obtain the common component identifier from the configuration file of the sub-application page. The common component identifier is used for uniquely identifying a corresponding common component. The common component is a component that is provided by the parent application and that may be commonly used by different sub-applications, has a visual form, and is a component unit of the sub-application page. Logic code for processing an event triggered by the common component may also be encapsulated in the common component. That different sub-applications commonly use the common component may be specifically that the same common component is called at the same time or at different moments. In an embodiment, the common component may be commonly used by the parent application and the sub-applications.

S606: Load a local common component corresponding to the common component identifier in a common page container.

Specifically, the terminal may load the common component that corresponds to the common component identifier and that is provided by the common page container in the common page container by using the parent application. The loaded common component may be a common component that corresponds to the common component identifier and that is selected from a common component library provided by the common page container.

The common component library is a set composed of common components provided by the parent application. Each common component in the common component library has a unique common component identifier. The common component library may be downloaded by the parent application from the server to a local location during running or may be obtained through de-compression by the parent application from a corresponding application installation package when the parent application is installed.

In an embodiment, the terminal may load component pattern data corresponding to the common component identifier in the common page container. The component pattern data is data for describing a presentation form of a corresponding common component. The component pattern data may include attributes, such as a location, a size, a color, a font, and a font size, of the corresponding common component in the sub-application page.

In this embodiment, use efficiency of the sub-application may be further improved by combining the locally provided common component with a preloading manner.

Figure 7:
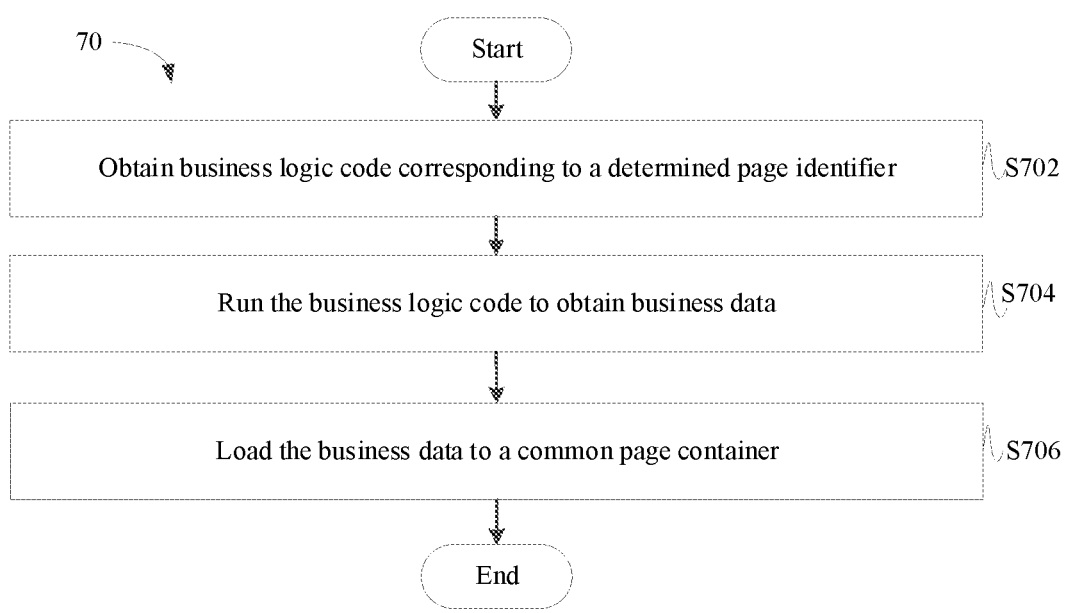
FIG. 7 is a schematic flowchart of a step of loading an independent resource of a sub-application page corresponding to a determined page identifier in a common page container according to an embodiment of the present disclosure.

As shown in FIG. 7, in an embodiment, step S36 specifically includes the following steps.

S702: Obtain business logic code corresponding to a determined page identifier.

The business logic code is code of processing logic of the sub-application page and may be a native language code or script code. The script code is, for example, JavaScript code. The business logic code may be obtained locally or from the server.

S704: Run the business logic code to obtain business data.

Specifically, the terminal may run the business logic code, and business data is obtained when the business logic code is run. Specifically, the business data may be directly obtained locally or from the server according to business logic in the business logic code or may be obtained through calculation according to business logic in the business logic code. The business data is different because the sub-application is different and may be social relationship data, social communication data, email data, game data, or the like.

S706: Load the business data to a common page container.

Specifically, the business data may be bound with a page element identifier in the corresponding sub-application page; when generating the sub-application page, the terminal renders the business data to a page element corresponding to the page element identifier bound by the business data. The page element is, for example, the common component or a self-defined picture.

In this embodiment, the business logic code may be run after the common page container is preloaded, to obtain the business data, to preload the business data in the common page container, thereby further improving use efficiency of the sub-application.

In an embodiment, the sub-application page is generated by a sub-application view layer processing unit that is in a one-to-one correspondence with the sub-application page; the common page container is preloaded by a sub-application logic layer processing unit; the independent resource of the sub-application page is loaded by the sub-application logic layer processing unit; the sub-application view layer processing unit and the sub-application logic layer processing unit are created by the parent application.

Figure 8:
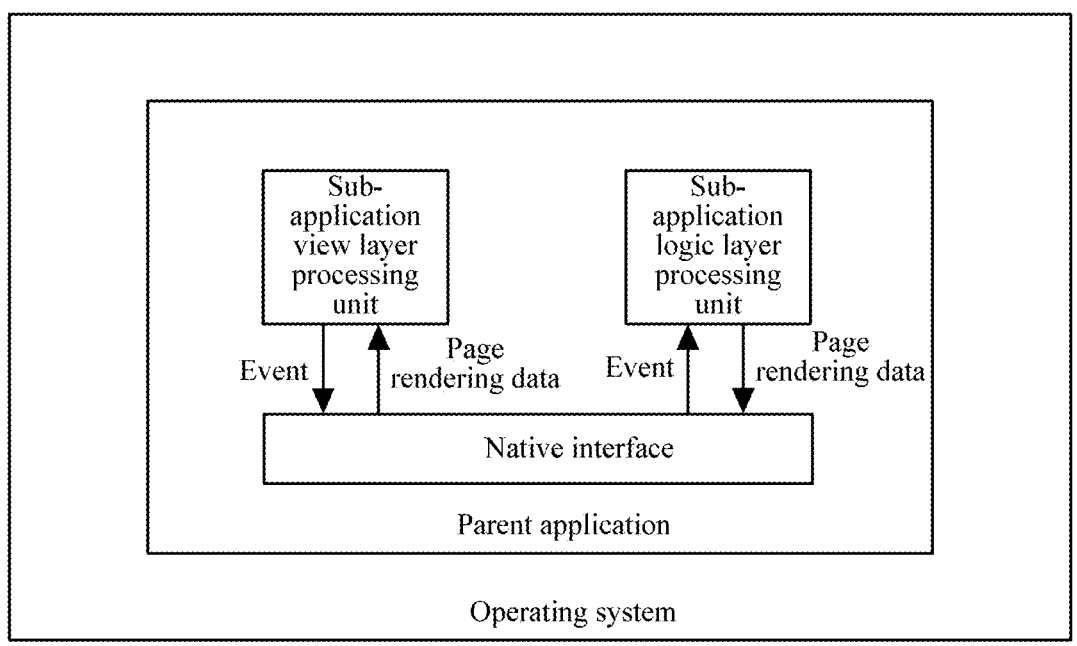
FIG. 8 is a schematic diagram of relationships between an operating system, a parent application, a sub-application view layer processing unit, and a sub-application logic layer processing unit according to an embodiment of the present disclosure.

Specifically, referring to FIG. 8, the parent application provides an environment to running of the sub-application and creates the sub-application logic layer processing unit for implementing the sub-application and the corresponding sub-application view layer processing unit. The sub-application view layer processing unit is configured to process a view of the sub-application. The sub-application logic layer processing unit is configured to process interactive logic of the sub-application. The processing unit may be specifically a process or thread, such as a sub-application logic layer thread and a corresponding sub-application view layer thread. The sub-application logic layer processing unit may be run in a virtual machine, and the sub-application view layer processing unit may be implemented by using a browser control. Different sub-application pages corresponding to the same sub-application identifier may commonly use the same sub-application logic layer processing unit, to facilitate overall management of the sub-application.

Figure 9:
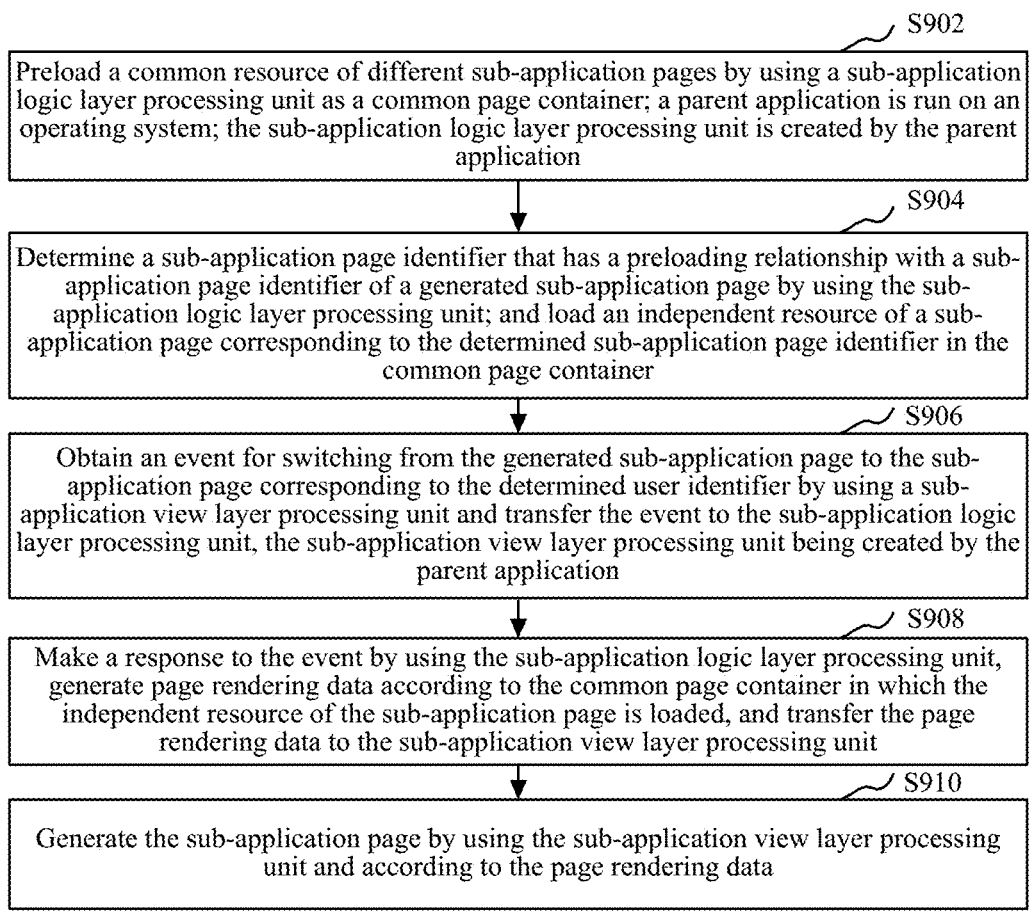
FIG. 9 is a schematic flowchart of an application page processing method according to an embodiment of the present disclosure.

As shown in FIG. 9, in an embodiment, an application page processing method specifically includes the following steps.

S902: Preload a common resource of different sub-application pages by using a sub-application logic layer processing unit as a common page container; a parent application is run on an operating system; the sub-application logic layer processing unit is created by the parent application.

S904: Determine a page identifier that has a preloading relationship with a page identifier of a generated sub-application page by using the sub-application logic layer processing unit; load an independent resource of a sub-application page corresponding to the determined page identifier in the common page container.

S906: Obtain an event for switching from the generated sub-application page to the sub-application page corresponding to the determined page identifier by using a sub-application view layer processing unit and transfer the event to the sub-application logic layer processing unit, the sub-application view layer processing unit and the sub-application logic layer processing unit being created by the parent application.

S908: Make a response to the event by using the sub-application logic layer processing unit, generate page rendering data according to the common page container in which the independent resource of the sub-application page is loaded, and transfer the page rendering data to the sub-application view layer processing unit.

S910: Generate the sub-application page by using the sub-application view layer processing unit and according to the page rendering data.

In this embodiment, the sub-application page is in a one-to-one correspondence with the sub-application view layer processing unit, so that each sub-application page is independent of each other. The sub-application view layer processing unit performs view presentation on the common page container and the independent resource of the sub-application page after the common page container and the independent resource of the sub-application page are both preloaded by using the sub-application logic layer processing unit, to facilitate efficient management of the sub-application page, thereby further improving use efficiency of the sub-application. In addition, the sub-application logic layer processing unit and the corresponding sub-application view layer processing unit separates a view layer and a logic layer of the application, and the configuration file of the sub-application page and logic code of the sub-application page may be respectively updated and used, thereby better facilitating implementation and maintenance of the sub-application.

In an embodiment, the configuration file of the sub-application page is compiled in a markup language. The logic code of the sub-application page is compiled in a script language. The sub-application logic layer processing unit and the sub-application view layer processing unit transit and communicate by using a native interface provided by the parent application.

The markup language is computer text coding that presents a document structure and data processing details by combining texts and other information related to the texts. The configuration file of the sub-application page may use an HTML, an XML, or an XML-extension-based self-defined markup language. The script language is, for example, JavaScript or VBScript. The native interface is an interface locally supported by the operating system, and may be, for example, Javascript Bridge. In an Android operating system, the native interface is a local frame and is compiled in a C language and/or a C++ language.

In this embodiment, the configuration file of the sub-application page is compiled in a markup language, so that edition of the configuration file of the sub-application page is intuitive and convenient. The logic code of the sub-application page is compiled in a script language, to implement logic of the sub-application. In addition, the sub-application logic layer processing unit and the sub-application view layer processing unit that use different computer languages may normally communicate by using the native interface provided by the parent application.

In an embodiment, the application page processing method further includes: calling, by using the sub-application logic layer processing unit and according to business logic code, an application programming interface response event provided by the parent application. In this embodiment, the event triggered in the sub-application page is processed by using the application programming interface provided by the parent application; the business logic code is used for configuring calling of the application programming interface provided by the parent application, so that the sub-application is implemented in a more lightweight manner.

In an embodiment, the application page processing method further includes: calling, by using the sub-application logic layer processing unit and according to business logic code, an application programming interface response event provided by the operating system. In this embodiment, the application programming interface processing event provided by the operating system is directly called by using the parent application, so that the sub-application is implemented in a more lightweight manner.

In an embodiment, the application page processing method further includes: calling, by using the sub-application logic layer processing unit and according to business logic code, an application programming interface provided by the parent application and calling, by using the application programming interface provided by the parent application, an application programming interface response event provided by the operating system. In this embodiment, the parent application processes, by using the application programming interface provided by the operating system, the event triggered in the sub-application page. This can alleviate burden on the parent application compared to that the event is completely processed by the parent application.

Figure 10:
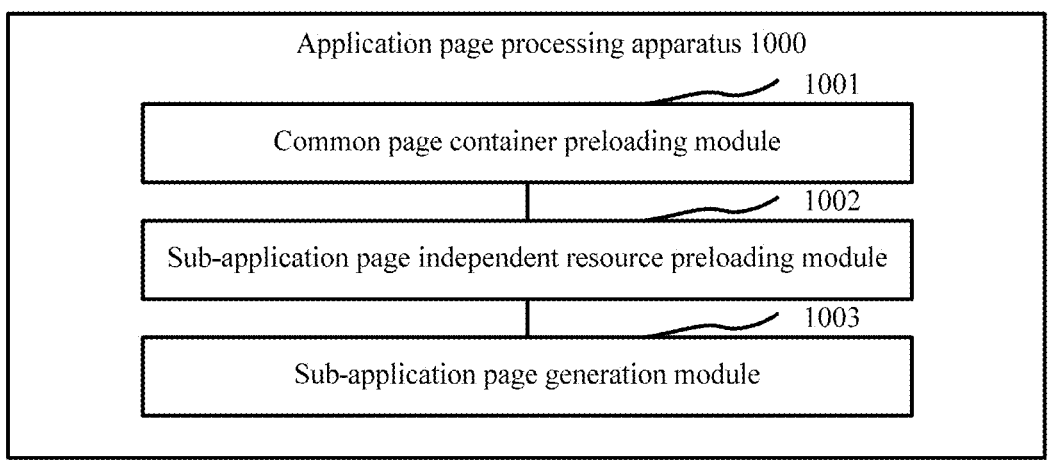
FIG. 10 is a structural block diagram of an application page processing apparatus according to an embodiment of the present disclosure.

As shown in FIG. 10, in an embodiment, an application page processing apparatus 1000 is provided, and the application page processing apparatus 1000 includes one or more memories and one or more processors. The one or more memories store one or more instruction modules, configured to be executed by the one or more processors. The one or more instruction modules include a common page container preloading module 1001, a sub-application page independent resource preloading module 1002, and a sub-application page generation module 1003.

The common page container preloading module 1001 is configured to preload a common resource of different sub-application pages as a common page container in an environment provided by a parent application, the parent application being run on an operating system.

The sub-application page independent resource preloading module 1002 is configured to: determine a page identifier that has a preloading relationship with a page identifier of a generated sub-application page; and load an independent resource of a sub-application page corresponding to the determined page identifier in the common page container.

The sub-application page generation module 1003 is configured to, when an event for switching to the sub-application page corresponding to the determined page identifier is obtained, generate the sub-application page corresponding to the determined page identifier according to the common page container in which the independent resource of the sub-application page is currently loaded.

In the foregoing application page processing apparatus 1000, the parent application is run on the operating system, and the parent application generates the sub-application page, thereby reducing time consumed by installation of the application and improving use efficiency of the sub-application. In addition, the common resource between different sub-application pages is preloaded as the common page container, and after a sub-application page that needs to be preloaded is determined, the independent resource of the sub-application page is further loaded, so that not all resources of the sub-application page need to be loaded every time, thereby further improving use efficiency of the sub-application through preloading.

In an embodiment, the sub-application page independent resource preloading module 1002 is further configured to: obtain a page identifier of a default sub-application page; and preload an independent resource of a sub-application page corresponding to the page identifier of the default sub-application page in a common page container.

The sub-application page generation module 1003 is further configured to generate the default sub-application page according to the common page container in which the independent resource of the sub-application page corresponding to the page identifier of the default sub-application page is loaded.

The common page container preloading module 1001 is further configured to re-preload a common resource as a new common page container.

In this embodiment, the common page container is preloaded, the default sub-application page is rapidly generated by using the common page container, and after the new common page container is generated, and switching is rapidly performed between different sub-application pages by using the common page container, thereby further improving use efficiency of the sub-application.

In an embodiment, the sub-application page independent resource preloading module 1002 is further configured to obtain page preloading configuration information on the server and search the preloading configuration information for a page identifier that has a preloading relationship with a page identifier of a generated sub-application page, the page preloading configuration information being configured by an account having configuration permission.

In this embodiment, the preloading relationship between the pages may be configured on the server by using the account having configuration permission, and preloading relationships between sub-application pages that are implemented on terminals by using the parent application may be conveniently and uniformly managed by using the account.

In an embodiment, the sub-application page independent resource preloading module 1002 is further configured to: send a query request carrying the page identifier of the generated sub-application page to the server and receive the page identifier of the sub-application page that is found in the page preloading configuration information according to the page identifier of the generated sub-application page and that is sent by the server, where the found page identifier of the sub-application page has a preloading relationship with the page identifier of the generated sub-application page in the page preloading configuration information, and the page preloading configuration information is configured by the account having configuration permission.

In this embodiment, query from the server may be conducted according to needs to determine a sub-application page that needs to be preloaded; when the preloading relationship configured on the server changes, change of the preloading relationship can be embodied in time, thereby further improving use efficiency of the sub-application.

In an embodiment, the sub-application page independent resource preloading module 1002 is further configured to: obtain a configuration file of a sub-application page corresponding to the determined page identifier; obtain a common component identifier from the configuration file of the sub-application page; and load a local common component corresponding to the common component identifier in a common page container.

In this embodiment, use efficiency of the sub-application may be further improved by combining the locally provided common component with a preloading manner.

In this embodiment, the independent resource of the sub-application page includes business logic code; the sub-application page independent resource preloading module 1002 is further configured to: obtain the business logic code corresponding to the determined page identifier; run the business logic code to obtain business data; and load the business data to the common page container.

In this embodiment, the business logic code may be run after the common page container is preloaded, to obtain the business data, to preload the business data in the common page container, thereby further improving use efficiency of the sub-application.

In an embodiment, the common page container preloading module 1001 is further configured to generate a corresponding sub-application page by using a sub-application view layer processing unit, the sub-application view layer processing unit being in a one-to-one correspondence with the corresponding sub-application page.

The sub-application page independent resource preloading module 1002 is further configured to preload the common page container and the independent resource of the sub-application page by using a sub-application logic layer processing unit.

The sub-application view layer processing unit and the sub-application logic layer processing unit are created by the parent application.

In this embodiment, the sub-application page is in a one-to-one correspondence with the sub-application view layer processing unit, so that each sub-application page is independent of each other. The sub-application view layer processing unit performs view presentation on the common page container and the independent resource of the sub-application page after the common page container and the independent resource of the sub-application page are both preloaded by using the sub-application logic layer processing unit, to facilitate efficient management of the sub-application page, thereby further improving use efficiency of the sub-application. In addition, the sub-application logic layer processing unit and the corresponding sub-application view layer processing unit separates a view layer and a logic layer of the application, and the configuration file of the sub-application page and logic code of the sub-application page may be respectively updated and used, thereby better facilitating implementation and maintenance of the sub-application.

A person of ordinary skill in the art may understand that all or some of the processes of the methods of the foregoing embodiments may be implemented by a computer program instructing relevant hardware. The program may be stored in a non-volatile computer readable storage medium. When the program is executed, the program may include the processes of the embodiments of the foregoing methods. The storage medium may be a magnetic disk, an optical disc, a read-only memory (ROM), or the like.

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The above embodiments only express several implementations of the embodiments of the present disclosure, which are described specifically and in detail, but cannot be accordingly construed as a limitation to the patent scope of the present disclosure. It should be noted that a person of ordinary skill in the art may make various transformations and improvements without departing from the ideas of the embodiments of the present disclosure, which all fall within the protection scope of the embodiments of the present disclosure. Therefore, the protection scope of the patent of the embodiments of the present disclosure shall be subject to the appended claims.

What is claimed is:

1. An application interface processing method performed at a terminal having one or more processors and memory storing programs to be executed by the one or more processors, the method comprising:
  running a parent application on an operating system of the terminal;
  detecting, from a user of the terminal, an input signal corresponding to an event of launching a first child application in an environment provided by the parent application, wherein the parent application is a social networking application;
  generating, by the parent application, a first common interface container by using a common resource, the common resource comprising data that a plurality of child application interfaces of multiple child applications share;
  in response to the event of launching the first child application, launching a first child application interface among the plurality of child application interfaces, loading an independent resource of the first child application interface in the first common interface container, the independent resource comprising data in the first child application interface other than the common resource;
  generating and displaying the first child application interface according to the first common interface container;
  generating a second common interface container using the common resource when generating the first child application interface, the second common interface container being generated for displaying and generating a second child application interface, the second common interface container being different from the first common interface container;
  in response to an event of switching from the first child application interface to the second child application interface, loading an independent resource of the second child application interface in the second common interface container; and
  generating and displaying the second child application interface according to the second common interface container, wherein the loading an independent resource of the first child application interface in the common interface container when obtaining an event for launching the first child application interface comprises:
    in response to an event of launching the first child application interface corresponding to a child application that is not currently running, obtaining an independent resource of a default child application interface of the first child application; and
    loading the independent resource of the default child application interface in the common interface container.

2. The method according to claim 1, wherein the generating a second common interface container comprises:
  creating the second common interface container by using the common resource of the plurality of child application interfaces.

3. The method according to claim 1, wherein the generating a second common interface container comprises:
  removing the second independent resource from a third common interface container in which a second independent resource is already loaded, to obtain the second common interface container.

4. The method according to claim 1, wherein the loading an independent resource of the first child application interface in the common interface container comprises:
  obtaining a configuration file of the first child application interface provided by a third-party device from a server;
  obtaining interface component information of the first child application interface from the configuration file; and
  obtaining data of interface components according to the interface component information and loading the data of the interface components into the common interface container.

5. The method according to claim 4, wherein the obtaining interface component information of the first child application interface from the configuration file and obtaining data of interface components according to the interface component information as the independent resource comprises:
  obtaining a common component identifier in the first child application interface from the configuration file; and
  loading data of a common component corresponding to the common component identifier in the parent application in the common interface container.

6. The method according to claim 5, further comprising:
  in response to an operation on the common component in the first child application interface, executing processing logic corresponding to the common component.

7. The method according to claim 1, wherein the loading an independent resource of the first child application interface in the common interface container comprises:
  obtaining business logic code of the first child application interface provided by a third-party device from a server; and
  obtaining business data as the independent resource by running the business logic code.

8. A terminal, comprising one or more processors; memory coupled to the one or more processors; and a plurality of computer programs stored in the memory that, when executed by the one or more processors, cause the terminal to perform a plurality of operations including:
  running a parent application on an operating system of the terminal;
  detecting, from a user of the terminal, an input signal corresponding to an event of launching a first child application in an environment provided by the parent application, wherein the parent application is a social networking application;
  generating, by the parent application, a first common interface container by using a common resource, the common resource comprising data that a plurality of child application interfaces of multiple child applications share;
  in response to the event of launching the first child application, launching a first child application interface among the plurality of child application interfaces, loading an independent resource of the first child application interface in the first common interface container, the independent resource comprising data in the first child application interface other than the common resource;
  generating and displaying the first child application interface according to the first common interface container;
  generating a second common interface container using the common resource when generating the first child application interface, the second common interface container being generated for displaying and generating a second child application interface, the second common interface container being different from the first common interface container;
  in response to an event of switching from the first child application interface to the second child application interface, loading an independent resource of the second child application interface in the second common interface container; and generating and displaying the second child application interface according to the second common interface container, wherein the loading an independent resource of the first child application interface in the common interface container when obtaining an event for launching the first child application interface comprises:

in response to an event of launching the first child application interface corresponding to a child application that is not currently running, obtaining an independent resource of a default child application interface of the first child application; and loading the independent resource of the default child application interface in the common interface container.

9. The terminal according to claim 8, wherein the operation of generating a second common interface container comprises:

creating the second common interface container by using the common resource of the plurality of child application interfaces.

10. The terminal according to claim 8, wherein the operation of generating a second common interface container comprises:

removing the second independent resource from a third common interface container in which a second independent resource is already loaded, to obtain the second common interface container.

11. The terminal according to claim 8, wherein the loading an independent resource of the first child application interface in the common interface container comprises:

obtaining a configuration file of the first child application interface provided by a third-party device from a server;

obtaining interface component information of the first child application interface from the configuration file; and obtaining data of interface components according to the interface component information and loading the data of the interface components into the common interface container.

12. The terminal according to claim 11, wherein the obtaining interface component information of the first child application interface from the configuration file and obtaining data of interface components according to the interface component information as the independent resource comprises:

obtaining a common component identifier in the first child application interface from the configuration file; and loading data of a common component corresponding to the common component identifier in the parent application in the common interface container.

13. The terminal according to claim 12, wherein the operation of generating a second common page container comprises:

in response to an operation on the common component in the first child application interface, executing processing logic corresponding to the common component.

14. The terminal according to claim 8, wherein the loading an independent resource of the first child application interface in the common interface container comprises:

obtaining business logic code of the first child application interface provided by a third-party device from a server; and obtaining business data as the independent resource by running the business logic code.

15. A non-transitory computer readable storage medium storing a plurality of instructions in connection with a terminal having one or more processors, wherein the plurality of instructions, when executed by the one or more processors, cause the terminal to perform a plurality of operations including:

running a parent application on an operating system of the terminal;

detecting, from a user of the terminal, an input signal corresponding to an event of launching a first child application in an environment provided by the parent application, wherein the parent application is a social networking application;

generating, by the parent application, a first common interface container by using a common resource, the common resource comprising data that a plurality of child application interfaces of multiple child applications share;

in response to the event of launching the first child application, launching a first child application interface among the plurality of child application interfaces, loading an independent resource of the first child application interface in the first common interface container, the independent resource comprising data in the first child application interface other than the common resource;

generating and displaying the first child application interface according to the first common interface container;

generating a second common interface container using the common resource when generating the first child application interface, the second common interface container being generated for displaying and generating a second child application interface, the second common interface container being different from the first common interface container;

in response to an event of switching from the first child application interface to the second child application interface, loading an independent resource of the second child application interface in the second common interface container; and generating and displaying the second child application interface according to the second common interface container, wherein the loading an independent resource of the first child application interface in the common interface container when obtaining an event for launching the first child application interface comprises:

in response to an event of launching the first child application interface corresponding to a child application that is not currently running, obtaining an independent resource of a default child application interface of the first child application; and loading the independent resource of the default child application interface in the common interface container.

* * * * *